(12) United States Patent
Rogalla et al.

(10) Patent No.: US 7,314,313 B2
(45) Date of Patent: Jan. 1, 2008

(54) BALANCING MACHINE

(75) Inventors: Martin Rogalla, Darmstadt (DE);
Werner Kissel, Biblis (DE); Juergen Muenzel, Ruesselsheim (DE)

(73) Assignee: Schenck RoTec GmbH, Darmstadt (DE)

( * ) Notice: Subject to any disclaimer, the term of this patent is extended or adjusted under 35 U.S.C. 154(b) by 0 days.

(21) Appl. No.: 10/514,974

(22) PCT Filed: May 13, 2003

(86) PCT No.: PCT/DE03/01532

§ 371 (c)(1),
(2), (4) Date: Nov. 17, 2004

(87) PCT Pub. No.: WO03/098180

PCT Pub. Date: Nov. 27, 2003

(65) Prior Publication Data

US 2005/0141790 A1    Jun. 30, 2005

(30) Foreign Application Priority Data

May 22, 2002    (DE) ................. 102 23 011

(51) Int. Cl.
*F16C 17/02*    (2006.01)

(52) U.S. Cl. .................................... 384/117

(58) Field of Classification Search ............ 384/117, 384/309, 310, 311, 114
See application file for complete search history.

(56) References Cited

U.S. PATENT DOCUMENTS

| 1,486,115 | A |   | 3/1924 | Allen |
|---|---|---|---|---|
| 2,402,205 | A |   | 6/1946 | Phelps |
| 4,743,125 | A | * | 5/1988 | Dammel et al. ............ 384/119 |
| 5,599,109 | A |   | 2/1997 | Negwer |

FOREIGN PATENT DOCUMENTS

| DE | 808 893 | 7/1951 |
|---|---|---|
| DE | 36 02 132 | 7/1987 |
| DE | 38 22 919 | 1/1990 |
| DE | 42 14 877 | 11/1993 |
| DE | 195 26 497 | 6/1996 |

OTHER PUBLICATIONS

"Automatische Auswuchtanlage fuer Lkw-Kurbelwellen AWS-K" (Automatic Balancing System for Truck Crankshafts AWS-K), HOFMANN report 24; Jan. 1975, Gebr. Hofmann KG, Darmstadt, Germany.

"Automatische Auswuchtanlage fuer Kurbelwellen AWS-K/222 T" (Automatic Balancing System for Crankshafts AWS-K/222 T), HOFMANN report 63; 1981, Gebr. Hofmann GmbH & Co. KG, Pfungstadt, Germany.

(Continued)

*Primary Examiner*—Lenard A. Footland
(74) *Attorney, Agent, or Firm*—W. F. Fasse; W. G. Fasse

(57) ABSTRACT

In a balancing machine for the measurement of, and compensation for, any unbalance of rotors, with a sliding bearing for rotatably mounting a rotor to be balanced and a supply device for supplying the sliding bearing with a fluid, the sliding bearing includes a bearing shell with a hollow cylindrical bearing face mounting a rotor section having a cylindrical sliding face. The bearing shell is made of a hard ceramic material and the supply device is designed to supply the fluid in minimum amounts.

25 Claims, 1 Drawing Sheet

OTHER PUBLICATIONS

G. Himmler, "Der Massenausgleich in der Auswuchttechnik" (The Mass Compensation in the Balancing Technology), Hofmann info 6, 1989; sections 3.0.0 to 3.2.3; Gebr. Hofmann GmbH & Co. KG, Pfungstadt, Germany.

"Auswuchtmaschinen fuer Kurbelwellen" (Balancing Machines for Crankshafts), B 1420, Carl Schenck AG, Darmstadt, Germany, no date.

* cited by examiner

BALANCING MACHINE

FIELD OF THE INVENTION

This invention relates to a balancing machine for the measurement of, and compensation for, any unbalance of rotors, in particular crankshafts, with a sliding bearing for rotatably mounting a rotor to be balanced and a supply device for supplying the sliding bearing with a fluid, said sliding bearing comprising a bearing shell with a hollow cylindrical bearing face mounting a rotor section having a cylindrical sliding face.

BACKGROUND INFORMATION

In balancing machines different bearing arrangements for rotatable support are provided for the rotor to be balanced, depending on the type and size of the rotor. Conventional bearing arrangements include, for example, supporting roller bearings in which the rotor is placed on pairs of supporting rollers. Where lightweight rotors are involved, use is made of prism bearings made from a wide variety of materials, the permissible compressive loads per unit area being however low. For lightweight rotors provision can be made for an aerostatic or aerodynamic bearing. At high rotational speeds and with heavyweight rotors, sliding bearings are conventionally used as, for example, hydrostatic or hydrodynamic sliding bearings. As such, the bearings employed are frequently similar or identical to those in operating condition, being accurately designed to fit the bearing journal of the respective rotor.

In a balancing machine of the type initially referred to, which is known from U.S. Pat. No. 1,486,115, the sliding bearing includes two spaced segmental bearing shoes mounted on a support in such a manner as to enable them to execute limited rocking motions. The bearing shoes have passageways terminating in the bearing face and communicating by means of flexible conduits with a supply system for the supply of oil under pressure. On rotation of the rotor held in the bearing, a wedge-shaped oil film carrying the rotor is formed between the rotor and the bearing shoes.

A balancing machine with fluid-supplied sliding bearings is furthermore known from the printed publication B 1420 "Auswuchtmaschinen für Kurbelwellen" (balancing machines for crankshafts) of the Carl Schenck AG of Darmstadt. In this machine, during the measuring run the sliding bearings are lubricated with filtered coolant used for cooling the balancing tool during the balancing operation.

In balancing machines the known sliding bearings supplied with fluid necessitate considerable constructional expenditure because of the need to provide special equipment for splash protection and for encapsulating the fluid supply system relative to the environment.

It is also known to use ceramic materials for the manufacture of the sliding or bearing faces of sliding bearings. From DE 195 26 497 A1, for example, a sliding bearing is known which has ceramic sliding members for the formation of a hydrodynamic lubricant wedge and a counteracting bearing face formed by a ceramic layer. Moreover, sintered composite materials for the formation of mating pairs of sliding bearings are known, with the composite materials having a pore volume sufficiently large to hold oil for bearing lubrication, cf. DE 38 22 919 A1, DE 42 14 877 A1. In the known ceramic bearings or porous bearings the cooperating sliding faces of the bearing partners are each of like or similar material.

SUMMARY OF THE INVENTION

It is an object of the present invention to provide a balancing machine of the type initially referred to, which is of straightforward construction, hence affording economy of manufacture, and is distinguished by high measurement accuracy.

To accomplish this object, in the balancing machine of the invention the sliding bearing is provided with a bearing shell made of a hard ceramic material, and the supply device for supplying the sliding bearing with a fluid, in particular an aerosol or oil aerosol, is designed to supply the fluid in minimum amounts.

According to the design of the invention, provision is made for a sliding bearing receiving a minimum amount of fluid and having a hard, wear-resistant ceramic bearing shell with little inclination to seize instead of, for example, a hydrodynamic sliding bearing of the type conventionally employed for carrying heavyweight rotors and at high speeds. Surprisingly, it has been found that with a hard and smooth ceramic bearing shell a very small amount of fluid is already sufficient to ensure a reliable lubricant and coolant supply. The bearing is operated under mixed-friction conditions, meaning that there is no complete separation of the surfaces of rotor journal and bearing shell. Tribologically particularly advantageous is the combination of metallic rotor journal and ceramic bearing shell. It prevents adhesive wear (seizing) reliably, although the bearing face is supplied with a minimum amount of lubricant. The invention enables the lubricant and coolant supply device to be reduced to a simple minimum-amount supply system, and the problems, in particular in terms of environmental compatibility which are encountered with a hydrodynamic fluid lubrication, are avoided.

According to the invention, the supply quantity for a sliding bearing is of the order of a few milliliters per hour, whereas in hydrodynamic sliding bearings, for example, amounts of the order of liters per minute are necessary. In the case of a fluid lubrication, special user specifications concerning operating material have to be customarily observed, which may differ from user to user or also on a case-by-case basis, which is advantageously not the case with the supply of the invention. Furthermore, it avoids the problems, in particular environmental problems, which exist when oils are used as operating fluids, in terms of fire, explosion and emission protection or water pollution regulations. The present invention hence ensures an environmentally friendly operation.

With regard to the achievable balancing accuracy it is particularly advantageous that wetting of the rotor with lubricant and coolant, which corrupts the measurement result in particular of rotors that are not rotationally symmetrical such as crankshafts, is avoided reliably. It is another advantage with respect to the achievable balancing accuracy that the bearing stiffness is not affected by a fluid film and hence by the angular velocity of the rotor. Furthermore, cost savings can be realized in that the supply as with aerosol is readily adaptable to the different operating conditions.

As aerosol an oil aerosol is advantageously used, which involves feeding oil atomized in air in microscopically fine particles to the area to be lubricated where it effects lubrication and, where applicable, also cooling. Since an extremely fine oil mist is produced, economical use of oil is ensured. The aerosol may also contain substances or additives which allow, for example, a non-adhering solid-state lubrication or which may have an influence on a homogeneous atomization of the aerosol.

In one embodiment of the invention in which provision is made for an aerosol application within the bearing area of the bearing shell, the continued use of components of a hydrodynamic or hydrostatic bearing is possible to advantage. This is also possible in cases where drip feed is used. Furthermore, the bearing shells are protected from contamination by the injection of the aerosol or can be cleaned easily thereby or by the injection of air, as and when necessary.

In a particularly simple embodiment provision is made for the fluid application to take place on the exposed surface of the rotor section that is not surrounded by the bearing shell. For a spray application as well as for a drip feed application, the discharge orifice of an atomizer and, respectively, the drip outlet can be positioned optimally. The spray application can be performed advantageously by a brief burst of the atomizer preferably at the beginning of the measuring run.

In order to ensure process security of the sliding bearing of the balancing machine of the present invention, according to a further proposal of the invention provision can be made for temperature monitoring the sliding bearing or a bearing shell thereof. Owing to the increasing friction between bearing shell and rotor journal, any failure of the minimum-amount lubrication will manifest itself in a rise in temperature and, accordingly, can be detected by temperature monitoring early and be utilized for the initiation of remedial action.

On a single-station balancing machine in which the rotor is not transferred between the measuring operation and the balancing operation, the discharge orifice of, for example, an atomizer or a drip feed device can be positioned advantageously at the bearing point during the measuring operation for bearing lubricating and cooling purposes, and during the balancing operation on the balancing tool for cooling and lubricating it. Considering that in such a machine several application sites have to be supplied with fluid, an economical consumption of the coolant and lubricant can be ensured in the most simple manner.

In order to be able to feed aerosol, for example, to the bearing points and the balancing sites separately and consecutively, movable supply lines may be provided which allow positioning at the respective application site. It is also possible to provide supply lines for each application site, which are adapted to be connected and disconnected.

When only selected application sites are to be supplied with the aerosol, but also when all of them are to be supplied with the aerosol simultaneously, the significant advantage of a "dry" balancing machine results which obviates the need to provide paneling such as splash guards or collection containers to collect dripping liquid. With the invention a "dry" type of fluid lubrication during the operations of both determining unbalance and balancing is accomplished for the first time.

BRIEF DESCRIPTION OF THE DRAWINGS

Advantageous embodiments of the present invention will be described in greater detail in the following with reference to the accompanying drawing. In the drawing.

DETAILED DESCRIPTION OF AN EXAMPLE EMBODIMENT OF THE INVENTION

Figure 1:
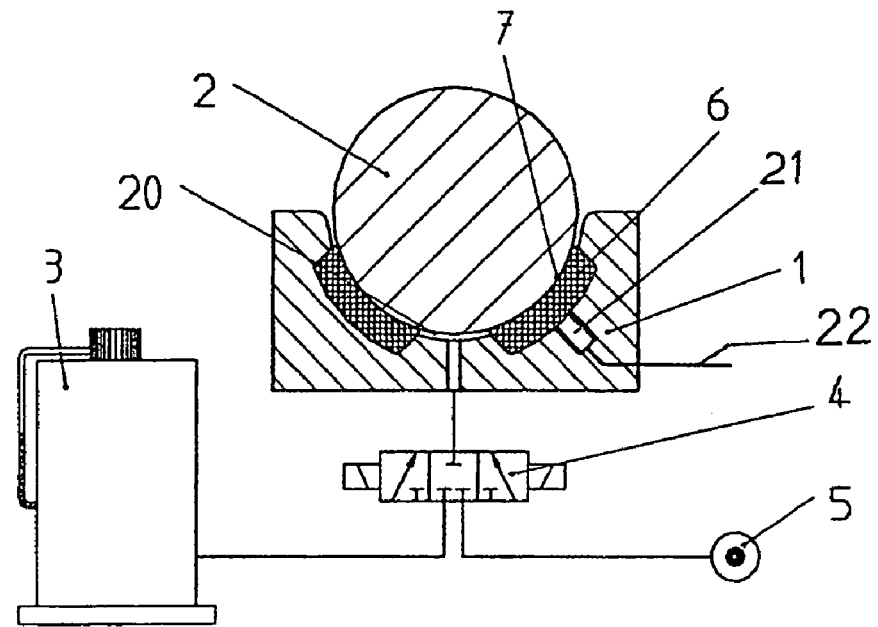
FIG. 1 is a sectional view of a bearing arrangement of the invention.

The bearing arrangement shown in FIG. 1 schematically comprises a sliding bearing 1 for the rotor 2, a fluid supply device 3 designed to supply minimum amounts of fluid, a control device 4 and a fluid pressure supply 5. The bearing arrangement is part of an unbalance measuring and compensating device, shown schematically in FIG. 2, for the rotor 2 and has two bearing posts 8, 9 as bearing arrangements in which the rotor 2 is carried with its bearing points 10, 11. For balancing, the rotor 2 is set in rotation in known manner, the out-of-balance vibrations occurring due to the unbalance to be removed are measured and evaluated, and the rotor 2 is balanced in predetermined compensation planes 12, 13 by the removal of material at the balancing sites.

The bearing arrangements include bearing shells 6 shaped to conform to the bearing journals of the rotor 2, which include the bearing points 10, 11. To receive the bearing journal, the bearing shell 6 has a hollow cylindrical recess 7 with a pocket-shaped indentation 20 for application of the aerosol or of air to be blown through the bearing point. By means of a control device 4 in the form of a directional control valve, the pocket-shaped indentation 20 communicates with either the fluid pressure supply 5 or the minimum amount fluid supply device 3, or it is shut off. The bearing shell 6 is comprised of two self-aligning bearing elements made of a very hard ceramic material and has a very smooth bearing face. Osculation between the bearing shell 6 and the rotor 2 is at the best possible level.

The fluid supply device 3 is constructed as an aerosol atomizer. Alternatively or additionally, it is also possible for the fluid supply device 3 to be designed to dispense minimum amounts of a fluid to a drip feeder or to supply a lubricating member which has its volume impregnated with fluid and is caused to make contact with the rotor section 2 at periodic intervals. With the aerosol atomizer, fluid such as oil is dispersed in air in minute particles and fed to a discharge orifice in the pocket-shaped indentation 20 of the bearing shell 6. For this purpose, the aerosol atomizer is in communication with the fluid pressure supply 5 for the supply of air under pressure and, via the control device 4, with the pocket-shaped indentation 20 during rotation of the rotor 2 in the measurement cycle, as shown schematically in the left-hand section of the control device 4. Tests have surprisingly revealed that for the balancing of heavyweight rotors at high speeds small amounts of aerosol in the range from about 1 to 100 ml/h are perfectly sufficient to reliably prevent any damage to bearing faces and excessive heating; all that is required is an aerosol burst lasting about 1 second at the beginning of the measuring run. As shown schematically in the right-hand section of the control device 4, when required the fluid pressure supply may be connected directly with the pocket-shaped indentation 20 for the purpose of cleaning the bearing point by having air blown therethrough; the supply of aerosol is then interrupted. It is however also possible for the bearing point to be cleaned with aerosol.

For monitoring the operating temperature provision is made on the bearing shell 6 for a temperature sensor 21 connected to the machine control by a line 22. This enables the instant release of an additional amount of fluid for lubricating the sliding bearing as soon as the operating temperature of the bearing exceeds a predetermined limit value. When the temperature continues to increase, the rotor may also be brought to a standstill.

Figure 2:
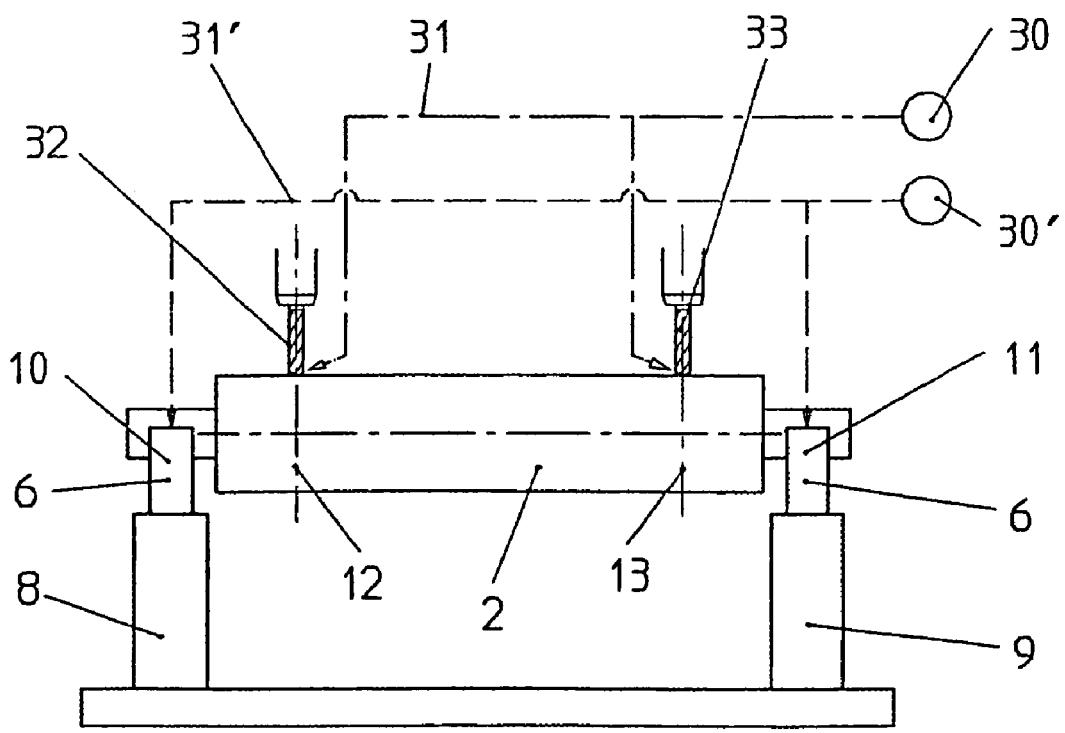
FIG. 2 is a side view of an unbalance measuring and compensating device.

The unbalance measuring and compensating device, illustrated schematically in FIG. 2, of a balancing machine includes two bearing posts 8, 9 with bearing shells 6 of the type shown in FIG. 1 for rotatably mounting the rotor 2, and it has a lubricant and coolant supply system communicating through ports 30, 30' with a minimum amount fluid supply device for supplying an aerosol. The minimum amount fluid supply device corresponds in principle to the device described with reference to FIG. 1. To compensate for the determined unbalance, balancing tools 32 and 33 are provided which remove rotor material at the balancing sites in the compensation planes 12, 13.

The lubricant and coolant supply system has two conduit systems 31 and 31' for supplying different application sites. The conduit system 31' supplies aerosol to the bearing points 10 and 11, while the conduit system 31 feeds aerosol to the balancing sites and the balancing tools 32 and 33. The discharge orifices of the supply lines of the conduit system 31' are arranged close to the rotor sections, not surrounded by the bearing shells 6, of the bearing points 10, 11, whereas the discharge orifices of the supply lines of the conduit system 31 are arranged close to the compensation planes of the rotor 2.

Alternatively, the discharge orifices of the supply lines of the conduit system 31' may be disposed within the bearing shells 6, as shown in FIG. 1.

For economic use of the aerosol, the supply lines may be connected such that during the measurement cycle only the bearing points 10, 11 are supplied with aerosol. Experience has shown that a brief burst of aerosol at the beginning of the measuring run is sufficient. During the balancing operation when the rotor 2 is at standstill aerosol is supplied exclusively to the balancing site where the balancing operation is in progress.

In an embodiment of the invention not shown in greater detail, provision is made for the conduit system 31 to include a movable supply line whose discharge orifice is in each instance positioned at the balancing site where the balancing operation is being performed.

In another embodiment provision can be made for only one conduit system with two movable supply lines which are each associated with either the two bearing points 10, 11 or the two balancing sites and which during the measurement cycle supply aerosol to both bearing points 10, 11, while during the balancing operation supply is only to the balancing site at which the balancing operation is being actually performed.

The present invention enables for the first time balancing machines of the "dry" type to be constructed which for the lubrication of bearings and the cooling of tools are typically equipped with handling and disposal devices for lubricants and coolants. Accordingly, the requirement of having to take measures serving to guard against splashes or to collect dripping liquid is completely obviated. The balancing result is not affected by the accumulation of liquid on parts of the rotor, which enhances the accuracy.

The invention claimed is:

1. A balancing machine for the measurement of, and compensation for, any unbalance of rotors, with a sliding bearing (1) for rotatably mounting a rotor (2) to be balanced and a supply device for supplying the sliding bearing with a fluid, said sliding bearing (1) comprising a bearing shell (6) with a hollow cylindrical bearing face mounting a rotor section of the rotor having a cylindrical sliding face, characterized in that the bearing shell (6) is made of a hard ceramic material and the supply device is designed to supply the fluid to the sliding bearing in such a minimum amount of the fluid in a range from 1 ml/h to 100 ml/h so as to avoid forming a supporting film of the fluid that would separate and prevent contact between the cylindrical sliding face of the rotor section and the cylindrical bearing face of the bearing shell.

2. The balancing machine as claimed in claim 1, characterized in that the minimum amount of fluid is fed in the form of an aerosol.

3. The balancing machine as claimed in claim 1, characterized in that the supply device is designed to feed the minimum amount of the fluid intermittently.

4. The balancing machine as claimed in claim 3, characterized in that the supply device is further designed to feed air during intervals between intermittent periods of feeding the fluid.

5. The balancing machine as claimed in claim 1, characterized in that provision is made for the fluid to be applied within a bearing area of the bearing face of the bearing shell (6).

6. The balancing machine as claimed in claim 1, characterized in that the supply device comprises a drip feed device or an atomizer, adapted to apply the fluid in the form of a brief burst.

7. The balancing machine as claimed in claim 1, characterized in that the ceramic material has a Vickers hardness of about 4,000 N/mm$^2$ or higher.

8. The balancing machine as claimed in claim 1, characterized in that the bearing face of the bearing shell is very smooth, having a surface roughness of Ra<0.2.

9. The balancing machine as claimed in a claim 1, characterized in that non oxide ceramic is provided as the ceramic material.

10. The balancing machine as claimed in claim 1, characterized in that the sliding face of the rotor section is made of metal.

11. The balancing machine as claimed in claim 1, characterized in that the bearing shell includes several self-aligning bearing elements.

12. The balancing machine as claimed in claim 1, characterized in that the bearing face of the bearing shell and the sliding face of the rotor section have a high-grade osculation.

13. The balancing machine as claimed in claim 1, characterized in that the sliding bearing is provided with a temperature monitoring device.

14. A balancing machine with a supply system for lubricating and cooling fluids which is associated with several application sites, according to claim 1, characterized in that the supply system is designed and arranged to feed the minimum amount of the fluid, as an aerosol, to the sliding bearing (1) for mounting the rotor (2) to be balanced and to a balancing tool (32) for the removal of rotor material from the rotor.

15. The balancing machine as claimed in claim 14, characterized in that the supply system includes supply lines (31, 31') leading to each one of the application sites.

16. The balancing machine as claimed in claim 14, characterized in that the supply system includes at least one movable supply line having a discharge orifice that is movable to different ones of the application sites.

17. The balancing machine as claimed in claim 16, characterized in that the movable supply line is adapted to be associated with one or several bearing planes for the rotor (2) and one or several compensation planes (12, 13) for the rotor (2).

18. The balancing machine as claimed in claim 14, characterized in that the supply system includes supply lines that are adapted to be connected and disconnected in dependence upon the measuring or balancing operation.

19. A balancing system comprising a balancing machine and a rotor that is to be balance-compensated using said balancing machine, wherein:
said balancing machine comprises a slide bearing with a bearing surface made of a hard ceramic, and a lubricant fluid supply device that supplies a lubricant fluid;
said rotor comprises a rotor journal with a journal a surface that is supported on said slide bearing;
said lubricant fluid supply device is adapted and arranged to supply said lubricant fluid to at least one of said bearing surface and said journal surface at such a low fluid supply rate in a range from 1 to 100 milliliters of said lubricant fluid per hour so as not to form a complete separating film of said lubricant fluid between said bearing surface and said journal surface; and
said journal surface is and remains in contact with and directly supported by said bearing surface despite said lubricant fluid being supplied to at least one of said bearing surface and said journal surface.

20. The balancing system according to claim 19, excluding splash guards to block splashes of said lubricant fluid and excluding all means to collect said lubricant fluid after it has been supplied to at least one of said bearing surface and said journal surface.

21. The balancing system according to claim 19, wherein said lubricant fluid supply device comprises an aerosol spray arrangement adapted to supply said lubricant fluid as an aerosol of said lubricant fluid.

22. A method of operating the balancing system according to claim 19, comprising the steps:
mounting said rotor on said balancing machine by supporting said journal surface on said bearing surface;
supplying said lubricant fluid at said low fluid supply rate to at least one of said bearing surface and said journal surface;
a rotating said rotor;
maintaining said journal surface in contact with said a bearing surface during said rotating despite said lubricant fluid supplied to at least one of said bearing surface and said journal surface; and
measuring and compensating an unbalance of said rotor.

23. The method according to claim 22, wherein said supplying comprises supplying a limited amount of said lubricant fluid only before beginning said rotating and not supplying any more of said lubricant fluid during said rotating.

24. The method according to claim 22, wherein said supplying is carried out only intermittently before, or during, or before and during, said rotating.

25. A balancing machine for the measurement of, and compensation for, any unbalance of rotors, with a sliding bearing (1) for rotatably mounting a rotor (2) to be balanced and a supply device for supplying the sliding bearing with a fluid, said sliding bearing (1) comprising a bearing shell (6) with a hollow cylindrical bearing face mounting a rotor section of the rotor having a cylindrical sliding face, characterized in that the bearing shell (6) is made of a hard ceramic material and the supply device is designed to supply the fluid in such a minimum amount so as to avoid forming a supporting film of the fluid that would separate and prevent contact between the cylindrical sliding face of the rotor section and the cylindrical bearing face of the bearing shell, and characterized in that provision is made for the fluid to be applied in an area of the sliding face, not surrounded by the bearing shell (6), of the rotor section.

* * * * *

UNITED STATES PATENT AND TRADEMARK OFFICE
CERTIFICATE OF CORRECTION

PATENT NO. : 7,314,313 B2  Page 1 of 1
APPLICATION NO. : 10/514974
DATED : January 1, 2008
INVENTOR(S) : Rogalla et al.

It is certified that error appears in the above-identified patent and that said Letters Patent is hereby corrected as shown below:

Column 5,
Line 64, after "cylindrical", delete "a";

Column 6,
Line 30, after "claimed in", delete "a";

Column 7,
Line 9, after "a journal", delete "a";

Column 8,
Line 1, before "rotating", delete "a";
Line 2, after "with said", delete "a".

Signed and Sealed this

Twenty-eighth Day of October, 2008

JON W. DUDAS
*Director of the United States Patent and Trademark Office*